April 11, 1950     A. ABGARIAN     2,503,605
REAR MOWER STRUCTURE

Filed April 29, 1946     3 Sheets-Sheet 1

INVENTOR.
ARAM ABGARIAN
ATTORNEYS

April 11, 1950     A. ABGARIAN     2,503,605
REAR MOWER STRUCTURE
Filed April 29, 1946     3 Sheets-Sheet 2

*INVENTOR.*
ARAM ABGARIAN
BY
ATTORNEYS

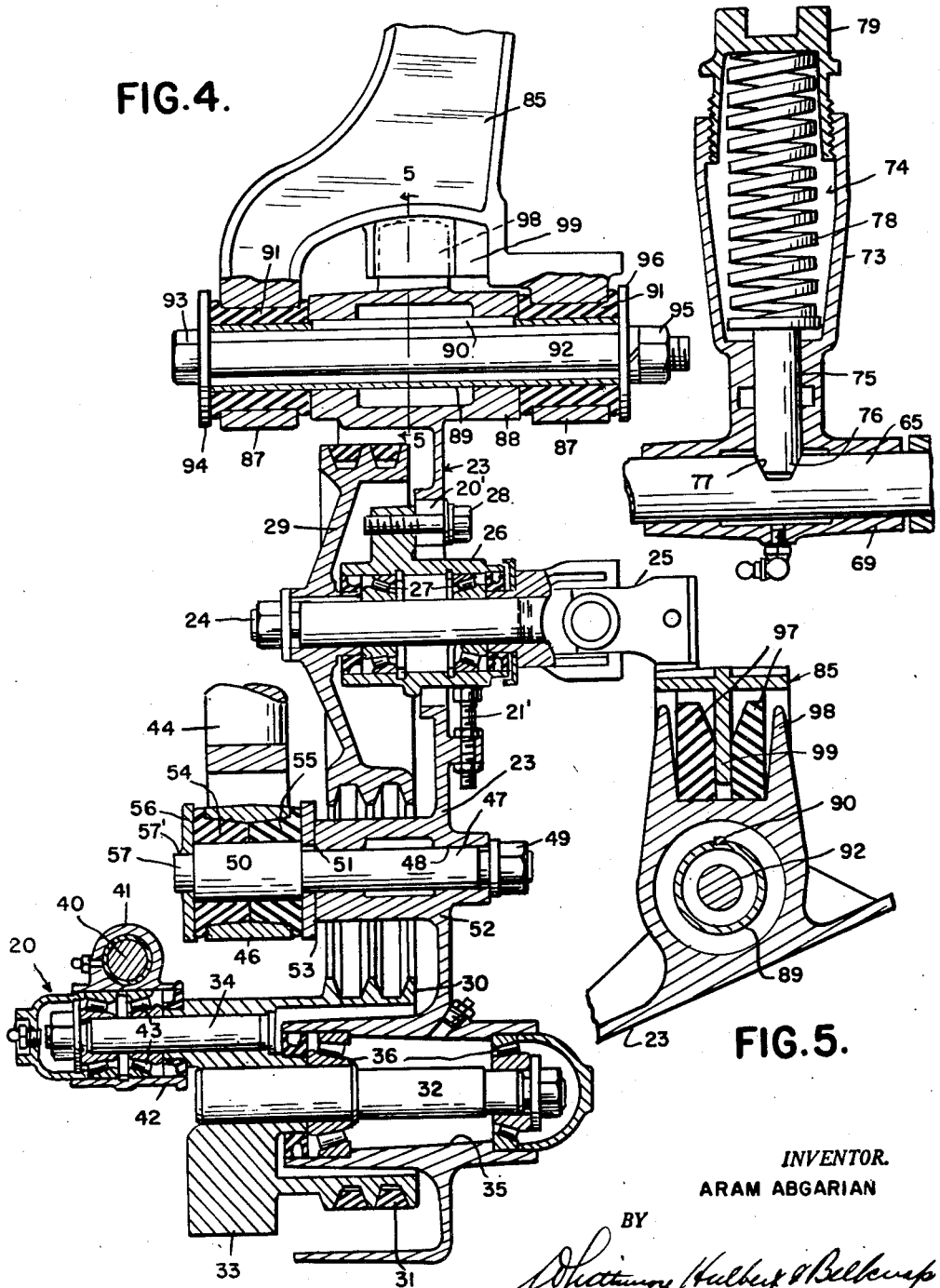

Patented Apr. 11, 1950

2,503,605

UNITED STATES PATENT OFFICE 2,503,605

REAR MOWER STRUCTURE

Aram Abgarian, Detroit, Mich., assignor to Detroit Harvester Company, Detroit, Mich., a corporation of Michigan Application April 29, 1946, Serial No. 665,764

6 Claims. (Cl. 56—25)

This invention relates generally to mowing machines and refers more particularly to improvements in side mowing equipment of the type adapted for attachment to tractors.

Mowing machines of the above general type usually comprise a knife supported for reciprocation and having the inner end operatively connected to the power take-off mechanism of the tractor by a driving unit responsive to movement of the tractor to reciprocate the knife at a rate depending on the speed of travel of the tractor. Such an arrangement has a tendency to set up serious vibrations which may have a deleterious effect on various parts of the equipment over long periods of use, and it is one of the objects of this invention to provide driving mechanism for the mower knife having means for dampening these vibrations.

Another object of this invention is to support the driving mechanism on a housing and to suspend the housing from the usual vertically movable draw bar on the tractor through a shock absorbing connection having provision for dampening shocks resulting from vibration of the housing.

A further object of this invention is to connect the driving mechanism on the housing to the cutter or knife with a pitman rod capable of swinging movement in a substantially horizontal plane without disconnecting or otherwise disturbing the operative connection of the rod with the driving mechanism.

Still another object of this invention is to connect the inner end of the cutter bar assembly to the housing with a drag bar having the inner end supported on the housing for horizontal swinging movement as a unit with the pitman rod. Thus, since both the pitman rod and drag bar are supported on the housing for horizontal swinging movement it follows that the cutter bar assembly may be swung rearwardly in response to abnormal thrusts imparted to the cutter bar assembly by stumps, rocks or other obstructions protruding from the ground.

A still further object of this invention is to provide driving and supporting means for a mower composed of a relatively few simple parts capable of being readily manufactured, assembled and installed.

The foregoing as well as other objects will be made more apparent as this description proceeds, especially when considered in connection with the accompanying drawings wherein:

Figure 3 is an enlarged sectional view taken on the line 3—3 of Figure 2;

Figure 4 is an enlarged sectional view through the housing or driving mechanism support; and Figure 5 is an enlarged sectional view taken on the line 5—5 of Figure 4.

Figure 1:
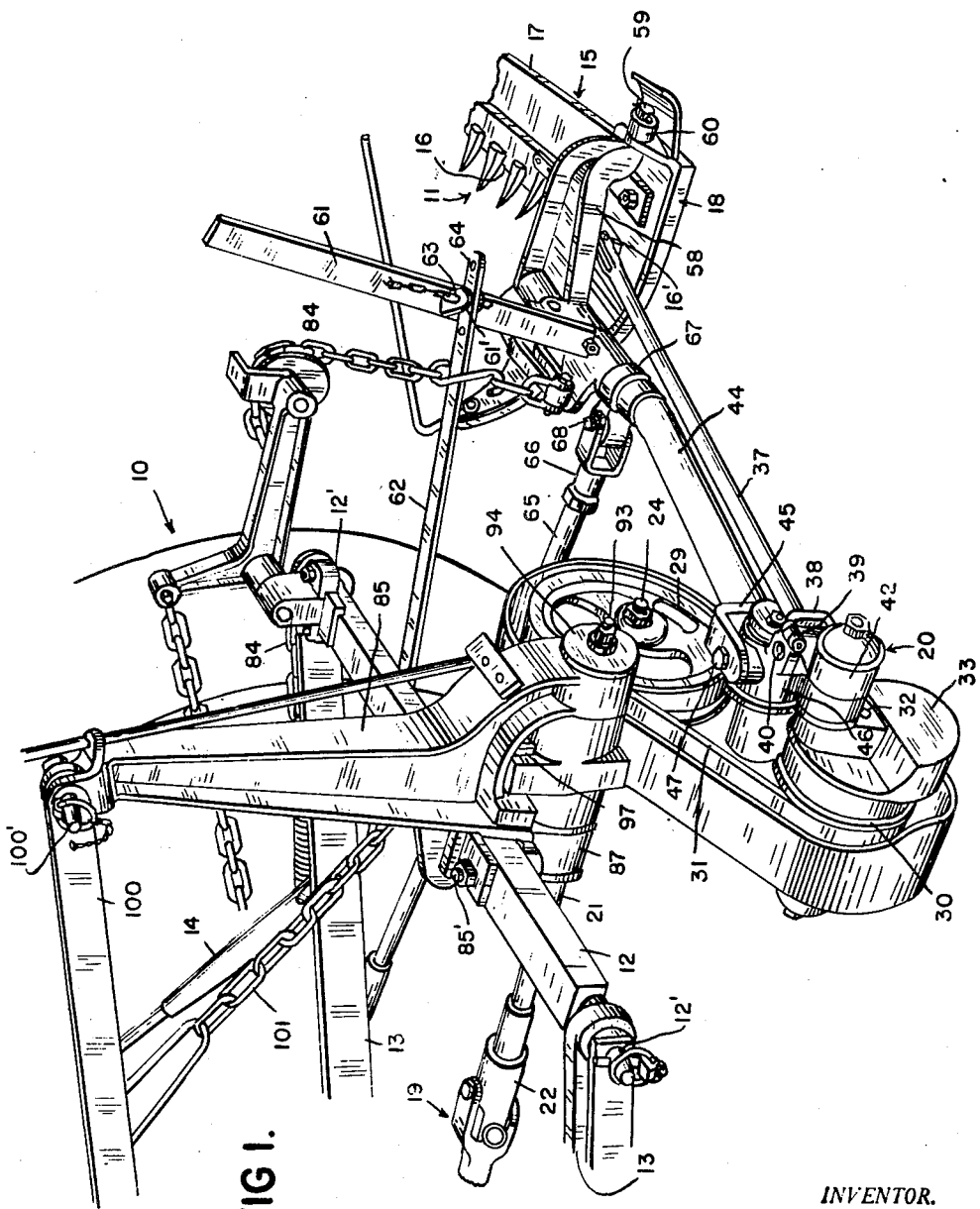
Figure 1 is a fragmentary perspective view of a mowing machine embodying the features of this invention and showing the same attached to the usual power operated arms at the rear of a conventional tractor.

Referring now more in detail to the drawings, it will be noted that the reference character 10 indicates a conventional tractor and numeral 11 designates a mowing machine embodying the features of this invention. The mowing machine is attached to the tractor by a draw bar 12 extending transversely of the tractor at the rear end of the latter and having the opposite ends respectively pivotally connected to the rear ends of a pair of links 13 in the manner indicated by the reference numeral 12' in Figure 1 of the drawings. The forward ends of the links are pivoted to the tractor in the usual manner to enable vertical swinging movement of the links and associated draw bar 12. As is common with tractors of the type illustrated, a power operated lever is provided for each link 13. One of these levers is indicated in Figure 1 of the drawings by the numeral 14 and has the lower end pivotally connected to the adjacent link 13 intermediate the ends thereof by a pin 14'. The lower end of the other lever is pivotally connected to the other link 13 intermediate the ends thereof in the same manner noted above and the upper ends of both levers are suitably connected to conventional power operated arms indicated generally by the numeral 13' in Figure 1 of the drawings.

The mowing machine 11 comprises a cutter bar assembly 15 normally extending laterally outwardly from one side of the tractor and having a suitable cutter or knife 16 reciprocably supported on a cutter bar 17. The inner end of the cutter bar 17 is secured to a ground engaging shoe 18 and the adjacent end of the knife 16 is operatively connected to the orthodox power take off 19 of the tractor 10 by driving mechanism 20.

The mechanism 20 comprises a drive shaft 21 having the front end removably connected to the power take off 19 by universal coupling 22 having a part 22' suitably removably clamped to the power take-off shaft for rotation by the latter and having the rear end connected to a stub shaft 24 by a second universal coupling 25. The shaft 24 is rotatably supported in a sleeve 26 by a pair of axially spaced roller bearings 27 and the sleeve 26 is adjustably secured to a support in the form of a housing 23 by studs 28. The studs 28 extend through vertically elongated slots 20' in the housing 23 and vertical adjustment of the sleeve 26 is accomplished by a set screw 21'. A pulley 29 is secured to the rear end of the stub shaft 24 for rotation as a unit with the latter and is connected to a second pulley 30 by means of suitable V-belts 31. The pulley 30 is secured to a driven shaft 32 and is provided with a counterweight 33. The pulley 30 also carries an eccentric pin 34 having its axis laterally offset with respect to the axis of the driven shaft 32. Upon reference to Figure 4 of the drawings it will be noted that the driven shaft 32 is journalled at axially spaced points in a bore 35 formed in the housing 23 and a pair of roller bearings 36 are secured in the bore 35 for rotatably supporting the shaft 32.

The eccentric pin 34 is connected to the inner end of the cutter or knife 16 by pitman rod 37 so that rotation of the driven shaft 32 effects a reciprocation of the knife 16 relative to the supporting cutter bar 17. The outer end of the pitman rod 37 is suitably secured to the inner end of the knife 16 by a pin 16', and the inner end of the rod 37 is pivoted to the eccentric pin 34. In detail, a yoke 38 is secured to the inner end of the pitman rod 37 and is formed on the furcations thereof with vertically split bearings 39 for clamping engagement with a vertical pin 40. The pin 40 is journalled in a bearing 41 formed on a collar 42 which in turn is journalled on the eccentric pin 34 by a set of roller bearings 43.

The support or housing 23 also forms a mounting for the drag bar 44 of the mowing machine. The inner end of the drag bar is provided with a yoke 45 having vertically spaced furcations adapted to receive a collar 46 therebetween. The furcations of the yoke 45 are respectively pivotally connected to diametrically opposite sides of the collar 46 by pins in the form of studs 47. The collar 46 is supported on the rear end of a pin 47 having the front end portion extending through a bore 48 formed in the housing 23 between the stub shaft 24 and the driven shaft 32. The front end of the pin 47 is threaded for receiving a clamping nut 49 and the rear end portion 50 of the pin is enlarged forming an annular shoulder 51. A lateral extension 52 of the housing 23 receives the pin 47 between the rear wall of the housing 23 and a washer 53 supported on the pin in abutting relationship to the shoulder 51. The collar 46 encircles the enlarged rear end portion 50 of the pin and has an internal diameter substantially greater than the external diameter of the enlarged portion 50. The annular space provided between the inner surface of the collar and the outer surface of the enlargement 50 is filled by a pair of rubber blocks 54 and 55.

The rubber blocks are held under compression in the annular space by a washer 56 sleeved on a reduced portion 57 of the pin and welded or otherwise secured in place in the manner indicated by the numeral 57'. The arrangement is such that the rubber blocks insulate the inner end of the drag bar from metallic contact with the housing 23 and provide a shock absorber connection for the drag bar. It will also be noted that the connection between the inner end of the drag bar 44 and the support or housing 23 permits the drag bar to swing in a substantially horizontal plane with the pitman rod 37.

The outer end of the drag bar is connected to the shoe 18 at the inner end of the cutter bar assembly with the result that the latter may be swung rearwardly in response to impacts applied thereto by stumps, rocks or other obstructions projecting above the ground over which the mower is operated. The particular means provided for connecting the outer end of the drag bar to the cutter bar assembly forms no part of the present invention and need not be described in detail herein. Generally, however, the outer end of the drag bar is journalled in a bore provided in a suitable hinge 58 in a manner to permit the hinge to rock about the axis of the drag bar. The hinge 58 is pivotally connected to the shoe 18 by pins 59 supported in alignment with each other on the hinge with their common axis extending perpendicular to the axis of rocking movement of the hinge about the drag bar 44. The pins 59 are respectively journalled in bearings 60 formed on the shoe 18. As a result of this construction the cuttter bar assembly may be readily swung from the horizontal position thereof shown in Figure 1 of the drawings to a substantially vertical or inoperative position. It has also been stated above that the cutter bar assembly 15 may be rocked in opposite directions about the outer end of the drag bar. This rocking movement is effected by a vertical lever 61 having the lower end rigidly secured to the hinge 58 and having a bifurcated bracket 61' secured to the inner side thereof intermediate its ends. The furcations of the bracket 61' are adapted to slidably receive therebetween the rear end portion of a link 62 having the front end portion fixedly secured in a manner to be more fully hereinafter described. The furcations of the bracket 61' are formed with aligned openings therethrough for receiving a pin 63 and the rear end of the link 62 is formed with a plurality of openings 64 spaced from each other longitudinally of the link for selective engagement with the pin 63. The arrangement is such as to permit securing the cutter bar assembly 15 in any one of several tilted positions.

In the present instance rearward swinging movement of the cutter bar assembly 15 is resisted by means of a pull bar 65 having a yoke 66 at the rear end pivoted to a collar 67 by a vertical pin 68. The collar 67 is suitably rotatably supported on the drag bar 44 adjacent the inner side of the hinge 58. The rear end portion of the pull bar 65 is slidably supported in a sleeve 69 having a projection 70 secured to a bracket 71 which in turn is clamped to the wheel housing 72 of the tractor. Upon reference to Figure 3 of the drawings it will be noted that the sleeve 69 is formed with a laterally projecting extension 73 and latch mechanism 74 is supported in the extension 73. The latch mechanism comprises a plunger 75 having a cam portion 76 at the inner end engageable in a correspondingly shaped notch 77 formed in the pull bar 65. The location of the notch 77 in the pull bar 65 is predetermined so that when the plunger is in engagement therewith, the cutter bar assembly assumes its operative position shown in Figure 1 of the drawings.

The plunger is normally retained in engagement with the pull bar 65 by means of a compression spring 78 supported in the extension 73 with the inner end abutting the plunger and with the outer end engaging an adjustable cap 79 forming a closure for the outer end of the extension 73. The force of the spring 78 is predetermined to retain the cam portion 76 on the plunger in the notch 77 during normal operation of the mowing machine. However, in the event the cutter bar assembly 15 strikes an obstruction, the rearward pull on the bar 65 is sufficient to cam the plunger out of the notch 77 and permit the cutter bar assembly to swing rearwardly. The extent of the rearward movement of the cutter bar assembly is limited by engagement of the stop 80 on the front end of the pull bar 65 with the adjacent end of the supporting bracket 69.

Figure 2:
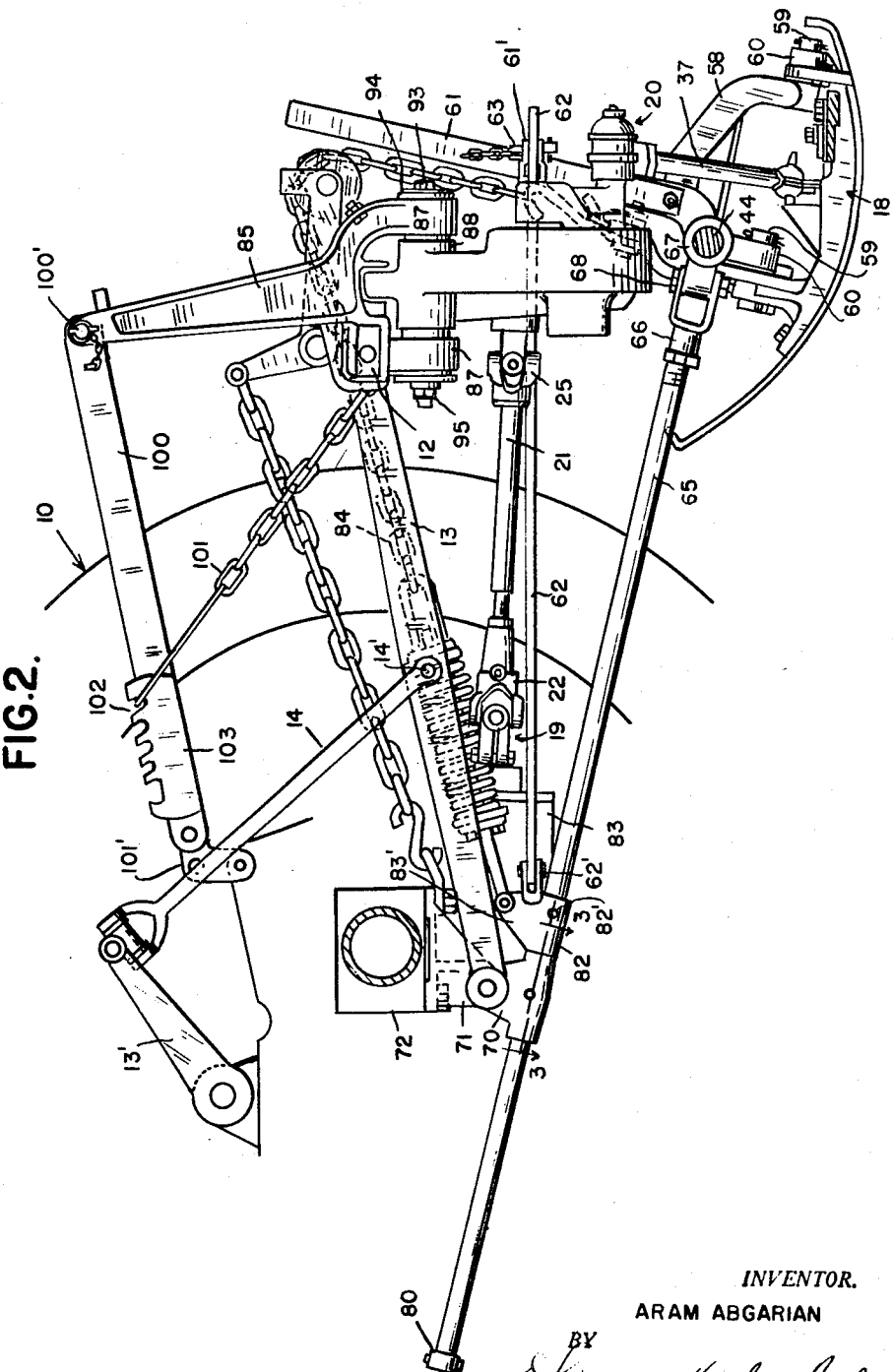
Figure 2 is a side elevational view partly in section of the mower structure.

Upon reference to Figure 2 of the drawings it will be noted that a second sleeve 82 is pinned to the pull bar 65 by a pin 82' at the rear side of the sleeve 69 and forms an anchorage for the forward end 62' of the tilt link 62. The sleeve 82 also provides anchorage means 83' for the counterbalancing spring unit 83 which forms the subject matter of another application and need not be described in detail herein. It will suffice to point out that the counterbalancing unit 83 is connected by a chain 84 to the shoe 18 and assists in swinging the cutter bar assembly upwardly to its inoperative position.

The driving mechanism including the housing 23 is supported on the draw bar 12 intermediate the ends of the latter. In detail, a pedestal 85 is secured to the draw bar 12 by bolts 85' and the lower end of the pedestal is formed with a pair of bearings 87 spaced from each other transversely of the draw bar 12. The spacing between the bearings 87 is sufficient to receive therebetween a boss 88 formed on the top wall of the housing and axially bored to receive a tube 89. The tube 89 is secured to the boss 88 by a key 90 and the opposite ends of the tube respectively extend through the bearings 87. The internal diameter of the bearings 87 is substantially greater than the external diameter of the tube 89 and relatively thick rubber bushings 91 are held under compression in the annular spaces provided between the bearings and the tube. As shown particularly in Figure 4 of the drawings, the inner ends of the bushings abut the outer ends of the boss 88 on the housing and are secured under compression by means of a draw bolt 92. The draw bolt 92 extends axially through the tube 89 and has a head portion 93 at one end engageable with a washer 94 which in turn abuts the outer end of the adjacent rubber bushing 91. The opposite end of the bolt is threaded for receiving a clamping nut 95 and the latter in turn engages a washer 96 which abuts the outer end of the adjacent rubber bushing 91. The above construction is such as to provide a shock absorbing connection between the housing 23 and the draw bar 12.

During operation of the cutter bar assembly a vibration is set up which tends to rock the housing about the axis of the tube 89. This vibration is dampened by a pair of rubber blocks 97 supported between a pair of upstanding lugs 98 formed on the upper end of the boss 88 in spaced relation to each other transversely of the axis of the tube 89. The upper ends of the rubber blocks 97 are shaped to receive a web 99 extending downwardly from the pedestal 85 between the bearings 87. Thus it will be noted that any tendency for the housing and associated driving mechanism to rotate about the axis of the bearings 87 is prevented by the rubber blocks 97.

The upper end of the pedestal is pivotally connected to the rear end of the link 100 by a pin 100' having the forward end pivotally connected to a fixed part of the tractor by a bracket 101'. The draw bar 12 is suspended from the link by means of a chain 101 having the lower end hooked to the draw bar intermediate the ends thereof and having the upper end selectively engageable in a plurality of notches 102 formed in a rack 103 which in turn is secured to the link adjacent the front end thereof. By selectively engaging the upper end of the chain with the notches 102 the elevation of the cutter bar assembly 15 relative to the ground may be varied.

What I claim as my invention is:

1. A mowing machine comprising a member attachable to a tractor, a cutter supported for reciprocation, driving mechanism operatively connected to the cutter, a support for the driving mechanism having a part provided with an opening, a second member clamped to the first member and having apertured portions positioned at opposite sides of said part, a pivot element secured intermediate the ends within the opening in said part and having the ends respectively extending through the apertures in the portions aforesaid on the second member, and bushings of resilient deformable material held under compression between the ends of the pivot element and the adjacent portions of the second member and adapted to be placed under torsion in response to the application of forces to said support tending to rock the latter relative to said first member.

2. A mowing machine comprising a member attachable to a tractor, a cutter supported for reciprocation, driving mechanism operatively connected to the cutter, a support for the driving mechanism having a part provided with an opening, a second member clamped to the first member and having apertured portions positioned at opposite sides of said part, a pivot element secured intermediate the ends within the opening in said part and having the ends respectively extending through the apertures in the portions aforesaid on the second member, bushings of resilient deformable material held under compression between the ends of the pivot element and the adjacent portions of the second member and adapted to be placed under torsion in response to the application of forces to said support tending to rock the latter relative to said first member, and shock absorbing means between the support and first member for limiting pivotal movement of the support relative to the first member.

3. A mowing machine comprising a member attachable to a tractor, a cutter supported for reciprocation, driving mechanism operatively connected to the cutter, a support for the driving mechanism having a part provided with an opening, a second member clamped to the first member and having apertured portions positioned at opposite sides of said part, a pivot element secured intermediate the ends within the opening in said part and having the ends respectively extending through the apertures in the portions aforesaid on the second member, bushings of resilient deformable material held under compression between the ends of the pivot element and the adjacent portions of the second member and adapted to be placed under torsion in response to the application of forces to said support tending to rock the latter relative to said first member, and shock absorbing means between the support and second member for limiting pivotal movement of the support relative to the first member, said shock absorbing means including blocks of resilient material carried by the support at one side of the pivot element and a projection on the second member extending between said blocks.

4. A mowing machine comprising a member attachable to a tractor, a cutter supported for reciprocation, driving mechanism operatively connected to the cutter, a support for the driving mechanism having a part provided with an opening, a second member clamped to the first member and having apertured portions positioned at opposite sides of said port, a pivot element secured intermediate the ends within the opening in said part and having the ends respectively pivotally supported in the apertures of said portions, a shock absorbing connection between the support and first member for limiting pivotal movement of the support relative to said member, said shock absorbing connection including blocks of elastic material carried by the support to one side of the pivot element and a part on the second member extending between the blocks of elastic material.

5. In a mowing machine attachment to tractors, including a reciprocatory cutter and a driving mechanism therefor, a member mountable on a tractor having a depending bifurcated portion with aligned bores in the furcations thereof, a frame for supporting said driving mechanism having a portion extending between said furcations and axially bored in alignment therewith, a shaft extending through and secured to said last mentioned portion with its opposite end portions extending into the bores of said furcations but spaced therefrom, resilient bushings in said bores between said shaft portions and furcations, a bifurcated portion of said frame extending radially from the shaft engaging portion thereof into the space between said first mentioned furcations and in a plane transverse thereto, a web on said first mentioned member extending between the furcations of said frame, and resilient cushions between said web and said frame furcations limiting the oscillation of said frame.

6. In a mowing machine attachment to tractors, including a reciprocatory cutter and a driving mechanism therefor, a member mountable on a tractor having a depending bifurcated portion with aligned bores in the furcations thereof, a frame for supporting said driving mechanism having a portion extending between said furcations and axially bored in alignment therewith, a hollow shaft extending through and secured to said last mentioned portion with its opposite end portions extending into the bores of said furcations but spaced therefrom, resilient bushings in said bores between said shaft portions and furcations, said bushings being flanged at their opposite ends to overlap said furcations, the inner flanges being between said furcations and the shaft engaging portion of said frame, plates adjacent to the outer flanges of said furcations, a clamping bolt extending through said hollow shaft and plates for placing said bushings and flanges under axial compression, a web extending between said furcations, a bifurcated portion of said frame embracing said web but spaced therefrom, and resilient cushions between said web and the furcations of said frame for limiting oscillation of said frame about the axis of said shaft, said compressed bushings absorbing vibrations of said frame including a portion of the oscillations about the axis of said shaft.

ARAM ABGARIAN.

REFERENCES CITED

The following references are of record in the file of this patent:

UNITED STATES PATENTS

| Number | Name | Date |
|---|---|---|
| 131,671 | Ells | Sept. 24, 1872 |
| 2,354,710 | Simpson et al. | Aug. 1, 1944 |

FOREIGN PATENTS

| Number | Country | Date |
|---|---|---|
| 264,312 | Great Britain | Jan. 20, 1927 |